United States Patent
Wortmann

(10) Patent No.: US 11,987,376 B2
(45) Date of Patent: May 21, 2024

(54) ELECTRIC DRIVE SYSTEM FOR AN AIRCRAFT WITH A MINIMAL YAWING MOMENT

(71) Applicant: Guido Wortmann, Fürth (DE)

(72) Inventor: Guido Wortmann, Fürth (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 474 days.

(21) Appl. No.: 16/844,708

(22) Filed: Apr. 9, 2020

(65) Prior Publication Data

US 2020/0324908 A1  Oct. 15, 2020

(30) Foreign Application Priority Data

Apr. 10, 2019 (DE) .......................... 102019205152.9

(51) Int. Cl.
| | |
|---|---|
| B64D 31/10 | (2006.01) |
| B64D 27/24 | (2006.01) |
| B60L 50/00 | (2019.01) |

(52) U.S. Cl.
CPC ............. *B64D 31/10* (2013.01); *B64D 27/24* (2013.01); *B60L 50/00* (2019.02); *B64D 2221/00* (2013.01)

(58) Field of Classification Search
CPC ........ B64D 27/02; B64D 27/24; B64D 35/02; B64D 2027/026; B64D 2221/00; B64D 31/10; B64C 2201/042
See application file for complete search history.

(56) References Cited

U.S. PATENT DOCUMENTS 4,787,201 A * 11/1988 Snow ................... G05D 1/0808
60/228
9,751,614 B1 * 9/2017 Nguyen ................. B64C 15/02
(Continued)

FOREIGN PATENT DOCUMENTS

| CH | 404416 A | 12/1965 |
| CN | 103993913 A | 8/2014 |

(Continued)

OTHER PUBLICATIONS

Loder, David C., et al., "Turbo-electric Distributed Aircraft Propulsion: Microgrid Architecture and Evaluation for ECO-150", 2018 IEEE Transportation Electrification Conference and Expo (ITEC) Date of Conference: Jun. 13-15, 2018, pp. 550-557 (Year: 2018 ).*

(Continued)

*Primary Examiner* — David A Testardi
(74) *Attorney, Agent, or Firm* — Lempia Summerfield Katz LLC

(57) ABSTRACT

The disclosure relates to an electric drive system for an aircraft and to a corresponding operating method. The electric drive system includes a multiplicity of electric thrust generators, wherein each electric thrust generator has an electric motor, and a subsystem group including a multiplicity of subsystems. The thrust generators are apportioned unambiguously between the subsystems so that each subsystem includes two or more of the thrust generators. Furthermore, a control system for operating the drive system is provided, wherein the control system is configured to operate the drive system in such a way that, at least in the event that one of the subsystems of the subsystem group is faulty, an overall yawing moment which is composed of the sum of the yawing moments of the thrust generators of each non-faulty subsystem of the subsystem group essentially disappears.

4 Claims, 1 Drawing Sheet

(56) References Cited

U.S. PATENT DOCUMENTS

| | | | |
|---|---|---|---|
| 10,450,080 B1* | 10/2019 | Beach | B64D 27/10 |
| 2004/0118969 A1* | 6/2004 | MacCready | B64C 1/26 |
| | | | 244/5 |
| 2012/0104154 A1 | 5/2012 | Yarger | |
| 2013/0094963 A1* | 4/2013 | Rolt | B64D 27/02 |
| | | | 416/31 |
| 2014/0316615 A1* | 10/2014 | Shue | G05D 1/0077 |
| | | | 701/3 |
| 2015/0144742 A1* | 5/2015 | Moxon | B64C 11/00 |
| | | | 244/65 |
| 2016/0325629 A1* | 11/2016 | Siegel | B60L 50/15 |
| 2016/0340051 A1* | 11/2016 | Edwards | B64D 35/02 |
| 2016/0365722 A1* | 12/2016 | Armstrong | H02H 7/267 |
| 2017/0066531 A1* | 3/2017 | McAdoo | B64C 27/26 |
| 2017/0253342 A1* | 9/2017 | De Magalhães Gomes | |
| | | | B64D 27/24 |
| 2017/0253344 A1* | 9/2017 | Wangemann | B60L 9/22 |
| 2017/0349274 A1 | 12/2017 | Fenny | |
| 2018/0118356 A1* | 5/2018 | Armstrong | B63H 21/17 |
| 2018/0178907 A1* | 6/2018 | Tovkach | B64C 27/08 |
| 2018/0297683 A1* | 10/2018 | Armstrong | B63H 21/21 |
| 2018/0305033 A1* | 10/2018 | Joubert | G05D 1/0072 |
| 2019/0009920 A1* | 1/2019 | Armstrong | H02J 3/12 |
| 2019/0291862 A1* | 9/2019 | Lyasoff | B64C 15/12 |
| 2019/0337612 A1* | 11/2019 | Carter, Jr. | B64C 29/0025 |
| 2020/0010187 A1* | 1/2020 | Bevirt | B64D 27/24 |
| 2020/0148372 A1* | 5/2020 | Long | B64D 27/24 |
| 2020/0148373 A1* | 5/2020 | Long | F01D 15/10 |
| 2020/0149427 A1* | 5/2020 | Long | F01D 15/10 |
| 2020/0363821 A1* | 11/2020 | Tzidon | B64C 11/46 |
| 2021/0229821 A1* | 7/2021 | Alt | H02J 1/082 |
| 2021/0339881 A1* | 11/2021 | Bevirt | G05D 1/0808 |
| | | | 60/228 |

FOREIGN PATENT DOCUMENTS

| | | |
|---|---|---|
| CN | 106741917 A | 5/2017 |
| CN | 107499506 A | 12/2017 |
| CN | 107878762 A | 4/2018 |
| CN | 108974348 A | 12/2018 |
| CN | 108791876 B | 1/2022 |
| FR | 3065443 A1 | 10/2018 |
| WO | 2017200610 A1 | 11/2017 |
| WO | 2018157897 A1 | 9/2018 |

OTHER PUBLICATIONS

Wikipedia article, "Blended wing body", Old revision dated Mar. 17, 2019, 5 pages. (Year: 2019).*
Simple Flying Staff, "Why Aircraft Need Vertical Stabilizers, But Birds Don't", article downloaded from https://simpleflying.com/why-aircraft-require-vertical-stabilizers/, May 2, 2022, 6 pages (Year: 2022).*
German Office Action for German Patent Application No. 10 2019 205 152.9, dated Feb. 20, 2020.
Chinese Office Action for Chinese App. No. 202010278292.0 mailed Jan. 10, 2024, pp. 1-12.
H.Z. Pu et al., "Hybrid attitude control for variable thrust axis based UAV," Journal of Nanjing University of Science and Technology, Oct. 2010, Abstract.

* cited by examiner

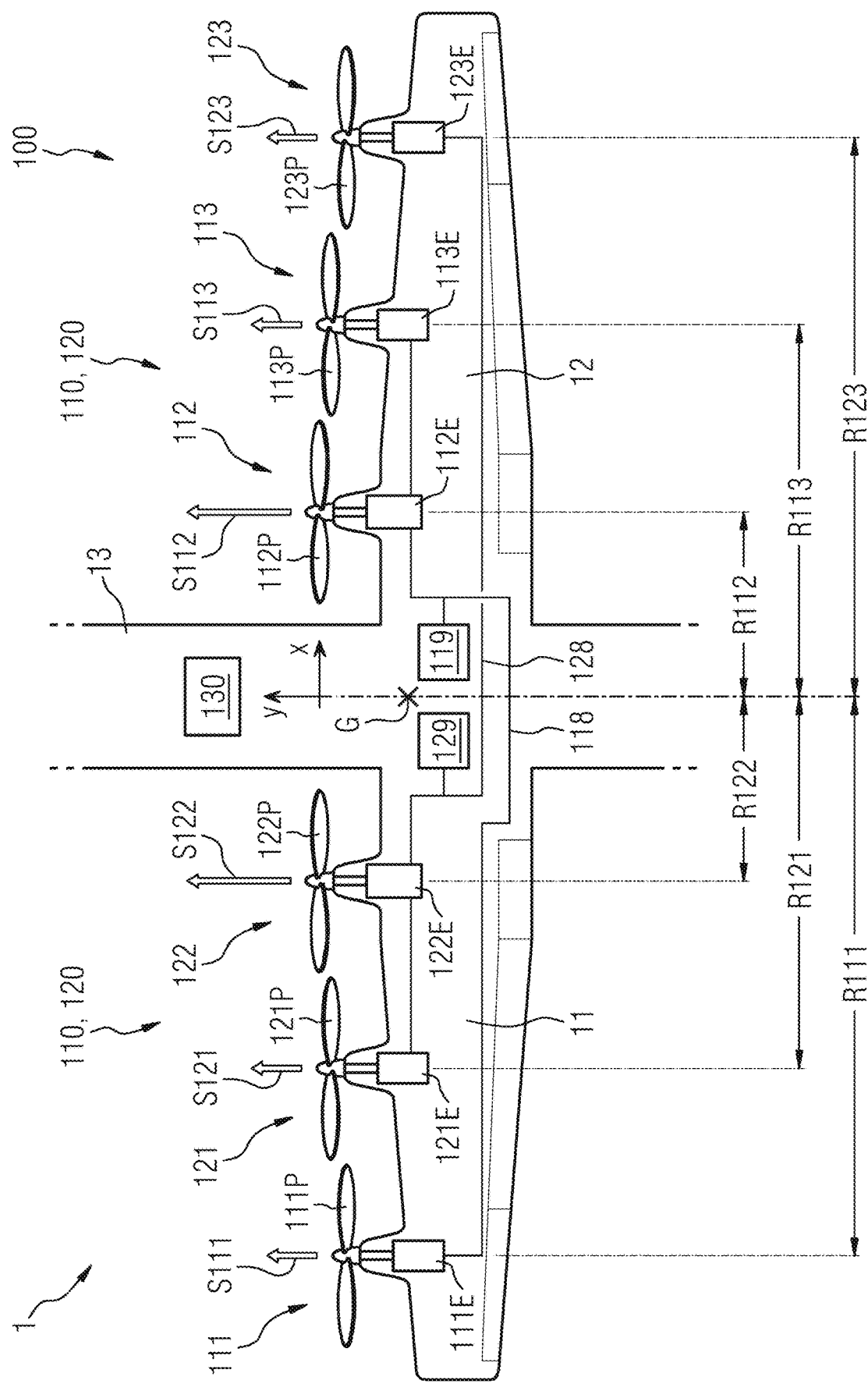

ELECTRIC DRIVE SYSTEM FOR AN AIRCRAFT WITH A MINIMAL YAWING MOMENT

The present patent document claims the benefit of German Patent Application No. 10 2019 205 152.9, filed Apr. 10, 2019, which is hereby incorporated by reference.

TECHNICAL FIELD

The disclosure relates to an architecture of an electric drive system of an aeroplane.

BACKGROUND

In order to drive aeroplanes, for example aircraft, concepts based on electric drive systems are being investigated and used to operate the required thrust generators, as an alternative to the customary internal combustion engines. Such an electric drive system, which may be embodied in a known fashion either in a purely electric or in a hybrid-electric fashion, may have a plurality of thrust generators, wherein a respective thrust generator includes, for example, a propeller and an electric motor for driving the respective propeller. Furthermore, energy supply devices are provided which make available the electrical energy which is required to operate the electric motors.

The thrust generators may be distributed on the wings of the aeroplane, (e.g., on the port side and starboard side), in such a way that an equal number of thrust generators are provided on each side so that in the normal operating mode of the drive system a symmetrical force distribution or thrust distribution is generated. In this context, a plurality of thrust generators of the drive system may be supplied with electrical energy by a common energy source. Accordingly, the thrust generators are therefore distributed on two or more subsystems of the drive system, wherein for each subsystem an energy supply is provided which supplies the thrust generators of the respective subsystem but not the thrust generators of another subsystem.

In the event of a fault, (e.g. when one of the subsystems fails), for example owing to a malfunction of the respective energy supply, asymmetry is produced to the effect that the thrust on that side on which the faulty thrust generator is arranged is lower or, under certain circumstances, fails entirely. This results in a moment about the yawing axis of the aircraft which has to be compensated in order to provide further straight and level flight.

In order to generate yawing moments selectively, the aircraft has both a vertical tail and a rudder. These may be dimensioned in such a way that they may be used to compensate the yawing moment resulting from asymmetrical thrust generation. The compensation is achieved, in particular, by virtue of the fact that, in the specified fault situation, the rudder is adjusted about the yawing axis so that owing to the interaction with the air stream a yawing moment is in turn generated which counteracts the yawing moment owing to the asymmetry and compensates it.

Therefore, with the available on-board means it is possible to provide, without a relatively large amount of expenditure, that despite the described fault situation the aircraft may continue to fly straight and level. However, the lateral adjustment of the rudder with respect to the air stream results in significantly increased air resistance, which has an adverse effect on the energy consumption and the efficiency of the drive system.

SUMMARY AND DESCRIPTION

An object of the present disclosure is therefore to specify a possible way of compensating the yawing moment which comes about owing to the failure of one of the thrust generators of the drive system.

This object is achieved by the electric drive system and by the operating method disclosed herein.

The scope of the present disclosure is defined solely by the appended claims and is not affected to any degree by the statements within this summary. The present embodiments may obviate one or more of the drawbacks or limitations in the related art.

An electric drive system for an aircraft includes a multiplicity of electric thrust generators, which are each equipped with an electric motor. Furthermore, a subsystem group including a multiplicity of subsystems is provided, wherein the thrust generators are apportioned unambiguously between the subsystems so that each subsystem includes at least one, (e.g., at least two), of the thrust generators. Furthermore, a control system for operating the drive system is provided. The control system is configured to operate the drive system in such a way that, at least in the event that one of the subsystems of the subsystem group is faulty, an overall yawing moment which is composed of the sum of the yawing moments of the thrust generators of each non-faulty subsystem of the subsystem group essentially disappears.

The term "unambiguously" means here that a thrust generator may be associated with just a single subsystem but not with two or more subsystems.

A yawing moment which is brought about by a thrust generator depends here on the instantaneously generated thrust of the thrust generator and on the distance of the thrust generator from the yawing axis.

One of the advantages of electric drive systems is that power or energy may be distributed in the drive system with comparatively little expenditure and low losses. This permits the construction of a wide variety of drive configurations, if appropriate with a multiplicity of electric thrust generators, each composed essentially of a propeller and an electric motor which drives the propeller. In the approach adopted here, this flexibility is utilized to the effect that the specific architecture of the drive system permits operation in which the resulting overall yawing moment ultimately disappears, e.g., in the event of one of the subsystems of the drive system failing. This is achieved in that the yawing moment which is brought about overall already by those thrust generators which are supplied by a common energy source is as small as possible and, for example, disappears.

In this context, the terms "as small as possible" and "essentially disappear" mean that the resulting overall yawing moment or the overall yawing moment remaining in the event of a fault is so small that the yawing moment compensation described at the beginning, (e.g., using the rudder), is superfluous.

In the event of the yawing moment having to be compensated solely by corresponding control of the remaining thrust generators or of their electric motors, it may be assumed that one of the remaining motors or, if appropriate, a plurality of the motors has to be operated at a non-ideal operating point, e.g., with non-optimum efficiency. As a result of the fact that in the presented solution the motors are distributed in such a way that, in the event of a failure of one of the subsystems, nevertheless no essential yawing moment occurs, the remaining motors may continue to be operated at a largely ideal operating point.

A further advantage of the approach adopted here is that in principle it is possible to dispense with the vertical tail, the rudder, and the corresponding software etc., for controlling the rudder, which would have a positive effect on the air resistance and the mass of the aircraft and would additionally reduce the complexity of the overall system. Because this would also reduce the resistances, particular during ascent, the drive system and its motors would also have to be less over-engineered.

Each subsystem may have a thrust generator group which includes, in each case, at least two thrust generators of the multiplicity of thrust generators. In each case, (e.g. in turn for each subsystem), at least one of the thrust generators of the respective thrust generator group is arranged on a starboard side of the aircraft and the other thrust generator or generators of the respective thrust generator group is/are arranged on a port side of the aircraft. This provides that the system may be operated in such way that the overall yawing moment essentially disappears.

Furthermore, a multiplicity of energy supplies may be provided, wherein, in each case, one energy supply and one subsystem are assigned to one another, wherein a respective energy supply supplies energy to the thrust generators of the subsystem assigned to it but not to the thrust generators of another subsystem of the subsystem group.

The drive system is advantageously configured in such a way that, on an individual basis, for each subsystem a subsystem yawing moment which is composed of the sum of the yawing moments of the thrust generators of the respective subsystem essentially disappears. In this way, the objective of also causing the overall yawing moment to disappear in the event of a fault may be achieved more easily.

Each of the thrust generators generates an individual thrust, wherein thrust generators with a relatively high individual thrust are arranged closer to a fuselage of the aircraft than thrust generators with a relatively low individual thrust. This also has a positive effect in that the objective of causing the overall yawing moment to disappear may be achieved more easily.

In a method for operating such an electric drive system, in the event that one of the subsystems of the subsystem group is faulty, the thrust generators of each non-faulty subsystem of the subsystem group are operated in such a way that an overall yawing moment which is composed of the sum of the yawing moments of these thrust generators of each non-faulty subsystem of the subsystem group essentially disappears.

In this context, even in the normal operating mode the thrust generators are advantageously operated in such a way that an overall yawing moment which is composed of the sum of the yawing moments of the thrust generators essentially disappears.

Each subsystem advantageously has a thrust generator group which includes in each case at least two thrust generators of the multiplicity of thrust generators, wherein in each case, e.g. in turn for each subsystem, at least one of the thrust generators of the respective thrust generator group is arranged on a starboard side of the aircraft and the other thrust generator or generators of the respective thrust generator group is/are arranged on a port side of the aircraft.

Ultimately, the thrust generators may be operated in such a way that thrust generators which are arranged closer to the fuselage of the aircraft generate a higher individual thrust than thrust generators which are arranged further away from the fuselage.

Further advantages and embodiments may be found in the drawings and corresponding description.

In the text which follows, the disclosure and exemplary embodiments will be explained in more detail with reference to drawings. In the drawings, identical components in different figures are characterized by identical reference symbols. It is therefore possible that when a second figure is being described, no detailed explanation will be given of a specific reference symbol if said symbol has already been explained in relation to another, first figure. In such a case, with the embodiment according to the second figure it may be assumed that, even without detailed explanation, the component characterized by this reference symbol there has the same properties and functionalities in relation to the second figure as explained in relation to the first figure. Furthermore, for the sake of clarity, in some cases not all the reference symbols are presented in all the figures, but only those to which reference is made in the description of the respective figure.

BRIEF DESCRIPTION OF THE DRAWINGS

In the figures:
The FIGURE depicts an example of a plan view of part of an aircraft.

DETAILED DESCRIPTION

The FIGURE depicts by way of example a plan view of part of an aircraft 1, wherein, in particular, the main wings 11, 12 of the aircraft 1 and the first and second thrust generators 111, 112, 113, 121, 122, 123, arranged on these wings 11, 12, of two subsystems 110, 120 of a drive system 100 of the aircraft 1 are illustrated. The first wing 11 is arranged, for example, on the port side, and the second wing 12 is arranged on the starboard side of the aircraft 1 or on the fuselage 13 thereof. The first subsystem 110 includes the first thrust generators 111, 112, 113 and a first energy supply 119 for supplying electrical energy to the first thrust generators 111, 112, 113. The second subsystem 110 includes the second thrust generators 121, 122, 123 and a second energy supply 129 for supplying electrical energy to the second thrust generators 121, 122, 123.

Each subsystem 110 or 120 but not each thrust generator 111, 112, 113, 121, 122, 123, accordingly has a separate energy supply 119 or 129, e.g. all the thrust generators 111, 112, 113 or 121, 122, 123 of a respective subsystem 110 or 120 are supplied by the same energy source 119 or 129. If this energy source 119 or 129 fails, all the thrust generators 111, 112, 113 and 121, 122, 123 of the corresponding, now faulty, subsystem 110 or 120 also fail. The two energy supplies 119, 129 are electrically connected to the respective thrust generators 111, 112, 113 and 121, 122, 123 via corresponding cabling 118, 128.

Each of the thrust generators 111, 112, 113, 121, 122, 123 respectively includes an electric motor 111E, 112E, 113E, 121E, 122E, 123E and a propeller 111P, 112P, 113P, 121P, 122P, 123P, wherein the respective propeller is driven by the electric motor of the respective thrust generator. For example, the motor 111E of the thrust generator 111 drives the propeller 111P of this thrust generator 111, as a result of which a thrust S111 is generated. The thrust generator 111 is arranged at a distance R111 from a longitudinal axis of the aircraft 1 on the fuselage 13 of the vehicle 1, with the result that in the normal operating mode it brings about a yawing moment $M111=R111*S111$ about the yawing axis G. The same applies to the configurations of the other thrust generators 112, 113, 121, 122, 123.

In the normal operating mode, the thrust generators 111, 112, 113, 121, 122, 123 generate the thrusts S111, S112, S113, S121, S122, S123, symbolized with the arrows, or the corresponding forces (force and thrust are used synonymously at this point) in they direction. Accordingly, a respective thrust generator 111, 112, 113, 121, 122, 123 brings about a yawing moment M111, M112, M113, M121, M122, M123, which depends on the respective thrust S111, S112, S113, S121, S122, S123 and on the distance R111, R112, R113, R121, R122, R123 of the respective thrust generator 111, 112, 113, 121, 122, 123 from a central reference point on the fuselage 13 in the x direction, which point corresponds ultimately to the yawing axis G. As already shown, the thrust generator 111 brings about a moment M111=S111*R111. Because in this coordinate system x, y the distances R111, R112, R113, R121, R122, R123 are under certain circumstances negative, under certain circumstances negative yawing moments M are produced.

The thrust generators 111, 112, 113, 121, 122, 123 of the subsystems 110, 120 are then arranged distributed selectively on the wing or wings 11, 12 in such a way that for each subsystem 110, 120 it is the case that, viewed in itself, the sum M110 or M120 of the respective yawing moments M111, M112, M113 and M121, M122, M123 may very largely disappear, e.g. for the respective subsystem yawing moment M110 or M120 of a respective subsystem 110 or 120 it is possible to achieve M110=M111+M112+M113=0 or M120=M121+M122+M123=0. This is ultimately achieved by virtue of the fact that not all the thrust generators 111, 112, 113 and 121, 122, 123 of a respective subsystem 110, 120 are arranged on the same wing 11 or 12. In other words, for each subsystem 110, 120, there is provision that at least one thrust generator 111, 112, 113 or 121, 122, 123 of the respective subsystem 110 or 120 is arranged on each of the two wings 11, 12.

As a result of this approach which causes the sum M110 or M120 and therefore the respective subsystem yawing moment M110 or M120 of a respective subsystem 110, 120 to disappear, there is no appreciable overall yawing moment Mtotal=M110+M120 acting on the aircraft 1 even in the event of failure of one of the subsystems 110, 120, because in this fault situation the overall yawing moment Mtotal acting on the aircraft 1 corresponds to the subsystem yawing moment M110 or M120 of the remaining, normally operating subsystem, for which M110=0 or M120=0 applies. Therefore, it is possible to dispense with compensation using the tail control surface, with the result that an increase in the air resistance with the disadvantages explained at the beginning may be avoided.

In the FIGURE, it is also indicated that the drive system 100 includes a control system 130 which performs open-loop control and, when necessary, also closed-loop control of the subsystem, in particular subsystems, 110, 120 or of their thrust generators 111, 112, 113, 121, 122, 123 and of their electric motors 111E, 112E, 113E, 121E, 122E, 123E. For the sake of clarity, an illustration of the connections, which are of course required, between the control system 130 and the corresponding components of the subsystems 110, 120 has been dispensed with.

The control system 130 is configured to operate the subsystems 110, 120 of the drive system 100 in such a way that the operation described above where M110=0 and M120=0 is achieved. In particular, in a fault situation, (e.g. when one of the subsystems 110 or 120 fails), the control system 130 is to operate the still intact subsystem 120 or 110 in such a way that M120=0 or M110=0. Because the geometry and in this context, in particular, R111, R112, R113, R121, R122, R123 are fixed and known, this operation is restricted to the thrusts S111, S112, S113 and S121, S122, S123 instantaneously generated by the individual thrust generators 111, 112, 113, 121, 122, 123.

A necessary precondition for this is that M110=0 or M120=0 may be implemented, but that, as described above, not all the thrust generators 111, 112, 113 and 121, 122, 123 of a respective subsystem 110 or 120 are arranged on the same wing 11 or 12 or that for each subsystem 110, 120 it is provided that at least one thrust generator 111, 112, 113 or 121, 122, 123 of the respective subsystem 110 or 120 is arranged on each of the two wings 11, 12. In the interaction with the latter, the control system 30 is configured in such a way that the control system 30 operates the thrust generators 111, 112, 113 and 121, 122, 123 of the intact subsystem 110 or 120 in the event of a fault in such a way that M110=0 or M120=0 applies to this intact subsystem 110 or 120. It results from this that—if, for example, the energy supplies 119 or 129 are considered to be components which are potentially susceptible to faults—the scope of a respective subsystem 110 or 120 is defined by those components of the drive system 100 supplied by the respective energy supply 119, 129.

In the above example, it was assumed that there were two subsystems with three thrust generators and one energy supply each. It is, of course, conceivable that more subsystems are used, wherein a linear number may advantageously be selected for the approach mentioned here. Furthermore, it is conceivable to vary the number of thrust generators per subsystem, but each subsystem may include at least two thrust generators in order to provide that in each case at least one of the thrust generators of a respective subsystem may be arranged on each side of the aircraft, e.g. on the starboard side and port side. Otherwise, the compensation of the yawing moment which fails to occur as a result of the failure of one of the subsystems may not be carried out.

Although the disclosure has been illustrated and described in greater detail by the exemplary embodiments, the disclosure is not restricted by these exemplary embodiments. Other variations may be derived herefrom by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An electric drive system for an aircraft, the electric drive system comprising:
   a multiplicity of electric thrust generators positioned on first and second wings of the aircraft; and
   a multiplicity of energy supplies configured to supply energy to the multiplicity of electric thrust generators,
   wherein the multiplicity of electric thrust generators comprises a first group of electric thrust generators having at least two electric thrust generators and a second group of electric thrust generators having at least two electric thrust generators, wherein, for each thrust generator group of the first group of electric thrust generators and the second group of electric thrust generators, at least one electric thrust generator of the respective thrust generator group is arranged on a starboard side of the aircraft and a remaining electric thrust generator or generators of the respective thrust generator group is/are arranged on a port side of the aircraft, wherein a first energy supply of the multiplicity of energy supplies is configured to supply energy to the first group of electric thrust generators but not to the second group of electric thrust generators, wherein a second energy supply of the multiplicity of energy supplies is configured to supply energy to the second group of electric thrust generators but not to the first group of electric thrust generators, wherein each electric thrust generator of the multiplicity of electric thrust generators is positioned at a respective distance from a central point of a fuselage of the aircraft, wherein each electric thrust generator of the multiplicity of electric thrust generators is configured to generate a yawing moment based on a thrust generated by the respective electric thrust generator and a distance of the respective electric thrust generator from the central point of the fuselage, wherein a sum of yawing moments generated by the first group of electric thrust generators during operation of the first group of electric thrust generators equals zero, and wherein a sum of yawing moments generated by the second group of electric thrust generators during operation of the second group of electric thrust generators equals zero, wherein the first group of electric thrust generators comprises a first electric thrust generator arranged on the starboard side of the aircraft and second and third electric thrust generators arranged on the port side of the aircraft, wherein the second group of electric thrust generators comprises fourth and fifth electric thrust generators arranged on the starboard side of the aircraft and a sixth electric thrust generator arranged on the port side of the aircraft, wherein the first electric thrust generator is arranged on the starboard side at a first distance from the central point of the fuselage of the aircraft, wherein the second and third electric thrust generators are arranged on the port side at a second distance and a third distance, respectively, from the central point of the fuselage of the aircraft, wherein the fourth and fifth electric thrust generators are arranged on the starboard side at a fourth distance and a fifth distance, respectively, from the central point of the fuselage of the aircraft, wherein the sixth thrust generator is arranged on the port side at a sixth distance from the central point of the fuselage of the aircraft, wherein the first distance is greater than the second distance, wherein the first distance is greater than the third distance, wherein the sixth distance is greater than the fourth distance, and wherein the sixth distance is greater than the fifth distance.

2. The electric drive system of claim 1, wherein, when the first group of electric thrust generators fails such that the electric thrust generators within the first group of electric thrust generators fail to generate any thrust, the yawing moment of the second group of electric thrust generators remaining in operation is zero.

3. A method for operating an electric drive system, the method comprising:

providing the electric drive system comprising: a multiplicity of electric thrust generators positioned on first and second wings of an aircraft; and a multiplicity of energy supplies configured to supply energy to the multiplicity of electric thrust generators, wherein the multiplicity of electric thrust generators comprises a first group of electric thrust generators having at least two electric thrust generators and a second group of electric thrust generators having at least two electric thrust generators, wherein, for each thrust generator group of the first group of electric thrust generators and the second group of electric thrust generators, at least one electric thrust generator of the respective thrust generator group is arranged on a starboard side of the aircraft and a remaining electric thrust generator or generators of the respective thrust generator group is/are arranged on a port side of the aircraft, wherein each electric thrust generator of the multiplicity of electric thrust generators is positioned at a respective distance from a central point of a fuselage of the aircraft, and wherein each electric thrust generator of the multiplicity of electric thrust generators generates a yawing moment based on a thrust generated by the respective electric thrust generator and a distance of the respective electric thrust generator from the central point of the fuselage;

supplying, by a first energy supply of the multiplicity of energy supplies, energy to the first group of electric thrust generators but not to the second group of electric thrust generators;

supplying, by a second energy supply of the multiplicity of energy supplies, energy to the second group of electric thrust generators but not to the first group of electric thrust generators; and operating the electric drive system such that a sum of yawing moments generated by the first group of electric thrust generators during operation of the first group of electric thrust generators equals zero, and a sum of yawing moments generated by the second group of electric thrust generators during operation of the second group of electric thrust generators equals zero, wherein the first group of electric thrust generators comprises a first electric thrust generator arranged on the starboard side of the aircraft and second and third electric thrust generators arranged on the port side of the aircraft, wherein the second group of electric thrust generators comprises fourth and fifth electric thrust generators arranged on the starboard side of the aircraft and a sixth electric thrust generator arranged on the port side of the aircraft, wherein the first electric thrust generator is arranged on the starboard side at a first distance from the central point of the fuselage of the aircraft, wherein the second and third electric thrust generators are arranged on the port side at a second distance and a third distance, respectively, from the central point of the fuselage of the aircraft, wherein the fourth and fifth electric thrust generators are arranged on the starboard side at a fourth distance and a fifth distance, respectively, from the central point of the fuselage of the aircraft, wherein the sixth thrust generator is arranged on the port side at a sixth distance from the central point of the fuselage of the aircraft, wherein the first distance is greater than the second distance, wherein the first distance is greater than the third distance, wherein the sixth distance is greater than the fourth distance, and wherein the sixth distance is greater than the fifth distance.

4. The method of claim 3, wherein, when the first group of electric thrust generators fails such that the electric thrust generators within the first group of electric thrust generators fail to generate any thrust, the yawing moment of the second group of electric thrust generators remaining in operation is zero.

* * * * *